United States Patent [19]
Nishio et al.

[11] Patent Number: 5,856,009
[45] Date of Patent: Jan. 5, 1999

[54] COATING FOR PHOSPHOR PARTICLES

[75] Inventors: Naoki Nishio; Akio Kamimoto; Yasuki Kawashima, all of Shiga, Japan

[73] Assignee: NEC Corporation, Tokyo, Japan

[21] Appl. No.: 730,601

[22] Filed: Oct. 15, 1996

[30] Foreign Application Priority Data

Oct. 12, 1995 [JP] Japan .................................... 7-263787

[51] Int. Cl.$^6$ ...................................................... B32B 5/16
[52] U.S. Cl. ........................... 428/404; 428/698; 428/701; 428/704
[58] Field of Search .................... 428/403, 404, 428/698, 701, 704

[56] References Cited

U.S. PATENT DOCUMENTS

| | | | |
|---|---|---|---|
| 4,540,914 | 9/1985 | Maple | 313/466 |
| 4,734,615 | 3/1988 | Koike et al. | 313/402 |
| 5,099,301 | 3/1992 | Kikinis | 257/379 |
| 5,177,406 | 1/1993 | Troxell | 315/169.1 |
| 5,223,341 | 6/1993 | Sigai | 428/403 |
| 5,418,062 | 5/1995 | Budd | 428/403 |
| 5,431,851 | 7/1995 | Karam et al. | 252/301.4 R |
| 5,643,685 | 7/1997 | Torikoshi | 428/690 |

*Primary Examiner*—H. Thi Le
*Attorney, Agent, or Firm*—Young & Thompson

[57] ABSTRACT

The present invention provides a coating phosphor comprising phosphor particles, heat resistive coating films which coat the phosphor particles and moisture proof coating films which coat the heat resistive coating films.

2 Claims, 3 Drawing Sheets

COATING FOR PHOSPHOR PARTICLES

BACKGROUND OF THE INVENTION

The present invention relates to a highly bright coating for phosphor having improved heat resistivity and moisture resistivity, a field luminescent panel with a luminescent layer using coating phosphor for obtaining high brightness and long life time, and a method for applying a coating onto a phosphor for improvement in moisture proof and keeping a high brightness for a long time.

The conventional field luminescent panel has the following structure. A reflective insulation layer is laminated on a back plate. A luminescent layer is further laminated on the reflective insulation layer. A transparent conductive sheet is laminated on the luminescent layer. Leads are provided on the transparent conductive sheet and the back plate. The back plate comprises a metal foil such as an aluminum foil. For the reflective insulation layer, high dielectric powders such as barium titanate are dispersed into an organic binder such as cyanoethylpullulan. For the luminescent layer, phosphor particles are dispersed into an organic binder such as cyanoethylpullulan. The phosphor particles are prepared by activating zinc sulfide with copper, silver and halogen. The transparent conductive sheet may be made of ITO. The above electro-luminance device is further sandwiched between outer coating films such as nitflone having a moisture proof property and further provided with a sheet of nylon having a hygroscopic property between the pane and the outer coating film.

The provisions of the nylon sheet and the outer coating films makes the total thickness of the device increased, whilst it is required to reduce the thickness of the panel.

It is possible to use fleon as a moisture resistive material but is not preferable to use them in view of an environmental pollution control measure. There has not been found out any high moisture resistive material in place of fleon. If the fleon is replaced by other materials but having a lower moisture resistivity than the fleon, it is necessary to increase the thickness of the moisture proof sheets whereby the total thickness of the panel is increased contrary to the requirement for reduction in thickness of the panel. Further, the increase in the thickness of the panel makes the brightness lower.

In order to have the luminescent panel free from any problems as described above, it was proposed to do a direct moisture resistive treatment to the phosphor. Namely, the phosphor is coated with a coating film having a moisture proof. For example, in the U.S. Pat. No. 4,585,673, it is disclosed to form a moisture proof coating film such as aluminum oxide on outer surfaces of the phosphor by a thermal chemical vapor deposition method using a reaction chamber illustrated in FIG. 1.

A cylindrically shaped reaction chamber 1 is placed so that a center axis is directed vertically. The cylindrically shaped reaction chamber 1 has a cylindrically shaped body 1a and a funnel-shaped portion 1b connected with the bottom of the cylindrically shaped reaction chamber 1. A filter 2 is provided at a boundary between the cylindrically shaped body 1a and at the funnel-shaped portion 1b. A first pipe 3 is provided at the bottom of the funnel-shaped portion 1b for supplying a first source gas. The first source gas is supplied to the chamber after heated. A second pipe 4 is provided at an upper position of the cylindrically shaped body 1a of the reaction chamber 1 for supplying a second source gas into the chamber. The second pipe 4 has an expanded nozzle having many discharge holes provided in a peripheral area thereof so that the second gases are injected widely and uniformly. A heater 5 is provided around the cyrindrically shaped body 1a for heating up the phosphor and the first and second source gases. The heater 5 is designed to allow setting various temperatures over time.

The method for applying a coating film onto the phosphor by use of the above reaction chamber will be described as follows.

The reaction chamber 1 is heated by the heater 5 up to a temperature in the range of 60° C. to 150° C. before the phosphor particles 6 are supplied into the reaction chamber 1.

The first gas is supplied through the first pipe 3 into the reaction chamber 1 wherein pressure is adjusted so that the first gas are fluidized over the filter 2. The second gas is supplied through the second pipe 4 and mixed with the first gas. The phosphor 6 is also fluidized over the filter 2 and in the mixed first and second gases. The phosphor 6 is made into contact with the mixed gases and further heated by the heater 5 up to a predetermined temperature but lower than 450° C. which is a critical temperature that the first and second gases are decomposed and reacted. The phosphor 6 is then heated up to a temperature over the above crystal temperature of 450° C., for example, 550° C. or 650° C. to cause the decomposition and reaction thereof so that the phosphor particles 6 in fluidizing state are coated with uniform moisture proof coating films. The supply of the first and second gases and the heating are then discontinued to obtain the moisture proof coating phosphor.

In the Japanese laid-open patent publications Nos. 63-278990 and 1-129090, there is disclosed other method for forming coating films on the phosphor particles, This method will be described with reference to FIG. 2.

A cylindrically shaped reaction chamber 7 is placed so that a center axis is directed vertically. The cylindrically shaped reaction chamber 7 has a cylindrically shaped body 7a and a funnel-shaped portion 7b connected with the bottom of the cylindrically shaped reaction chamber 7. A filter not illustrated is provided at a boundary between the cylindrically shaped body 7a and at the funnel-shaped portion 7b. A pipe 8 is provided at the bottom of the funnel-shaped portion 7b for supplying a first source gas. A high frequency coil 9 is placed in the reaction chamber 7 and connected to a high frequency power source not illustrated. The reaction chamber is contained in a sealed chamber 10 which makes a reduced pressure. A pipe 10 is provided to the sealed chamber and connected to a vacuum pump. The phosphor 11 is supplied in the reaction chamber 7. An infrared lamp not illustrated is further provided to heat the phosphor particles 11 in the reaction chamber 7 up to about 200° C.

The method for applying a coating film onto the phosphor by use of the above reaction chamber will be described as follows.

The sealed container 10 is opened to introduce the phosphor particles 11 into the reaction chamber 7. Subsequently, the sealed container 10 is closed to make the sealed container reduced in pressure at 1.3 to 2670 Pa, preferably 6.7 to 667 Pa.

Via the pipe 8, source gases, for example, mixed gases of nitrogen gas and silane gas are supplied to the reaction chamber 7 to make the phosphor particles 11 fluidizing so as to have entire surfaces of the phosphor particles 11 contact with the source gases.

A high frequency current is applied to the high frequency coil 9 to make nitrogen-containing gas plasma in the coils 9 so as to set the phosphor particles 11 at a predetermined temperature so that moisture proof coating films made of silicon nitride are formed on the phosphor particles 11.

The phosphor particles 11 are then maintained in the above states for a predetermined time in the range of 1–500 min. before the high frequency current application is then discontinued. The supply of the gas via the pipe 8 is discontinued. The sealed chamber is opened to pick up the treated phosphor particles.

If the phosphor particles are coated by the oxide such as aluminum oxide in the manner as described with reference to FIG. 1, it is necessary to rise the temperature of the phosphor particles up to more than 450° C. Zinc sulfide is activated with copper to prepare phosphor which will subsequently be coated with the coating film in the manner as described with reference to FIG. 1. In this case, sulfur may be eliminated from the particles due to the high temperature. There may appear migration or elimination of copper as an activator whereby changing composition of the phosphor and damaging the same. As a result, the brightness is considerably reduced.

If, however, the phosphor particles are coated with silicon nitride in the manner as described with reference to FIG. 2, a high temperature heat treatment over 400° C. is necessary for forming fine coating films over the phosphor particles whereby the phosphor particles receive damages and the brightness thereof is considerably reduced.

In general, the phosphor particles have rough surfaces, for which reason it is difficult to remove pin holes by coating the nitride film such as silicon nitride film.

In the manner described with reference to FIG. 1, the phosphor particles 6 are fluidized by the pressure of the first gas. But this pressure of the first gas provides influence to the proper concentration of the second gas. Namely, the gas pressure for having the phosphor particles has to be adjusted in consideration of not only the amount of the phosphor particles supplied but also the weight of the phosphor particles, wherein the weight is increased due to adhesion of the reaction product. Namely, a complicated adjustment for the amount of the source gases supplied is needed.

On the other hand, if undecomposed source gases are heated at a high temperature over 400° C., the brightness and the coloring quality are deteriorated even the moisture resistivity is not deteriorated.

In the manner as described with reference to FIG. 2, the decomposition and reaction of the source gases appear only in the coil 9, whilst at a position distanced from the coil 9 the phosphor particles are not coated with the reaction product at a sufficient thickness and are even subjected to a high temperature whereby the luminance property is deteriorated. The above local reaction near the coil 9 needs a long time. If the phosphor particles pass through the coil 9 but are biased, then it is difficult to keep constant a distance between the individual particles and the coil 9. This makes it difficult to obtain uniform thickness of the moisture proof coating film even the time of treatment is sufficiently long.

If the diameter of the coil 9 is enlarged to settle the problems, a high frequency power source of a large capacity is needed thereby increasing the cost of the treatment.

As described above, even it is possible to form moisture proof coating films on the phosphor particles, the phosphor particles are heated thereby the brightness is reduced and the life-time is shortened.

Further, the phosphor particles are fluidized by the balance of the gas upstream and the gravity of the particles. If a large amount of the phosphor particles is treated, a high pressure of the source gas is needed to have the large amount of the phosphor particles. A sudden gas pressure application may cause a dispersion of the phosphor particles. In order to prevent this dispersion of the particles, a large reaction chamber is needed and the accessory thereof is also needed to be enlarged.

SUMMARY OF THE INVENTION

Accordingly, it is an object of the present invention to provide a coating for phosphor free from any problems as described above.

It is a further object of the present invention to provide a coating for phosphor free of any damage.

It is a further more object of the present invention to provide a coating for phosphor possessing a high moisture proof and a high brightness as well as a long life time.

It is a still further object of the present invention to provide a method for forming coating films on phosphor free of any damage, but possessing a high moisture proof and a high brightness as well as a long life time.

It is yet a further object of the present invention to provide a field luminance panel having a high brightness and a long life-time.

The above and other objects, features and advantages of the present invention will be apparent from the following descriptions.

The present invention provides a coating phosphor comprising phosphor particles, heat resistive coating films which coat the phosphor particles and moisture proof coating films which coat the heat resistive coating films.

The heat resistive coating films are made of a metal oxide and the moisture proof coating films are made of nitride. For example, metal oxides such as silicon oxide, titanium oxide, tantalum oxide, zirconium oxide, yttrium oxide, barium titanate, strontium titanate, and zirconium titanate are available as a material for the first coating film.

The present invention also provides a field luminescent panel having a back plate and a transparent plate spaced from the back plate, and laminations of a luminance layer and a reflective insulation film provided between the back plate and the transparent plate, wherein in the luminance layer, a fluorine system resin binder is dispersed with a coating phosphor comprising phosphor particles, heat resistive coating films which coat the phosphor particles and moisture proof coating films which coat the heat resistive coating films and wherein another fluorine system resin binder is dispersed with high dielectric powders.

The present invention also provides a method for forming a coating film on a phosphor particle, wherein phosphor particles are supplied into a reaction chamber and fluidized at a relatively low temperature and further first and second source gases are supplied to cause plasma states whereby compounds generated from the first and second gases are made into contact with surfaces of the fluidized phosphor particles to form a first coating film on the phosphor particle before the particles are heated up from the relatively low temperature to introduce third and fourth source gases into the reaction chamber to cause a plasma state so that the third and fourth source gases are made into contact with the first coating film coating the phosphor particle to thereby form a second coating film.

The present invention also provides another method for forming a coating film on a phosphor particle, wherein phosphor particles are supplied into a reaction chamber and fluidized at a relatively low temperature and further first and second source gases are supplied to cause plasma states whereby compounds generated from the first and second gases are made into contact with surfaces of the fluidized phosphor particles to form a first coating film on the phosphor particle before annealing to the phosphor particles and subsequently the particles are heated up from the relatively low temperature to introduce third and fourth source gases into the reaction chamber to cause a plasma state so that the third and fourth source gases are made into contact with the first coating film coating the phosphor particle to thereby form a second coating film.

The annealing is carried out in an oxygen atmosphere at a temperature of 600°–900° C. for 1–60 minutes.

The first source gas is a compound having an ethoxy system. The second source gas is an oxygen gas. The third source gas is a silane gas. The fourth source gas is a nitrogen containing gas.

The phosphor particles are heated at a temperature of 300°–700° C. to form the second coating film.

According to the present invention, surfaces of the phosphor particles are made smooth before the first coating film having the heat resistivity is formed on the phosphor particles and subsequently the second coating film having the moisture proof is formed on the first coating film. This makes it possible to form the second coating film at a high temperature without deterioration of the luminance property. Synergistic effects of the smooth surface in association with the particles allows a high brightness coating phosphor with an excellent moisture proof.

The coating for phosphor is dispersed in the fluorine system resin binder to form the luminance layer in the high brightness and long life time field luminance panel.

In accordance with the present invention described above, the phosphor particles to be coated moves with a stable support by the bottom electrode. The phosphor particles are stable in their positions in relation to a pair of electrodes that generate plasma atmosphere. For those reasons, it is possible to form multiple coating layers on surfaces of the phosphor particles with a stability and a high yield. The first coating film is formed easily at a relatively low temperature for preventing the phosphor particles from thermal deterioration. The second coating film with a high moisture proof is formed at a higher temperature under the effect of the thermal resistivity of the first coating film.

BRIEF DESCRIPTIONS OF TIE DRAWINGS

Preferred embodiments of the present invention will be described in detail with reference to the accompanying drawings.

PREFERRED EMBODIMENTS

Figure 1:
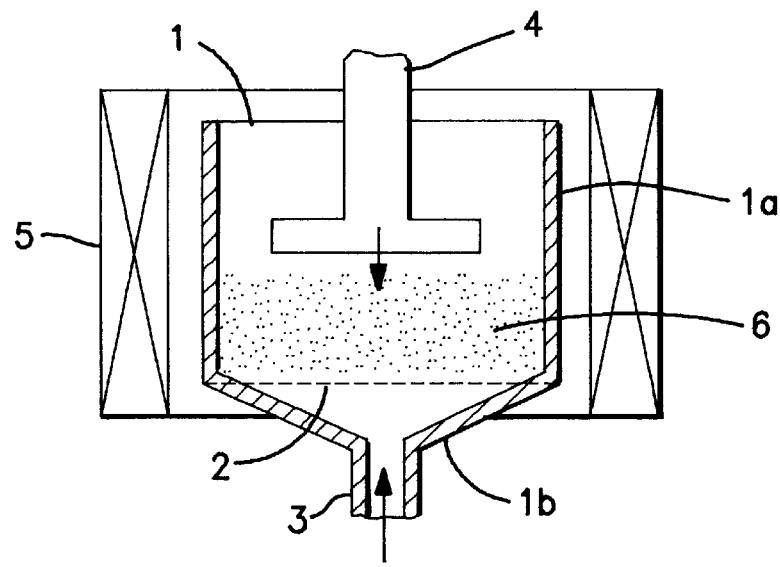
FIG. 1 is a cross sectional elevational view illustrative of the conventional apparatus for applying coating films on phosphor particles by use of the conventional thermal chemical vapor deposition method.
Figure 2:
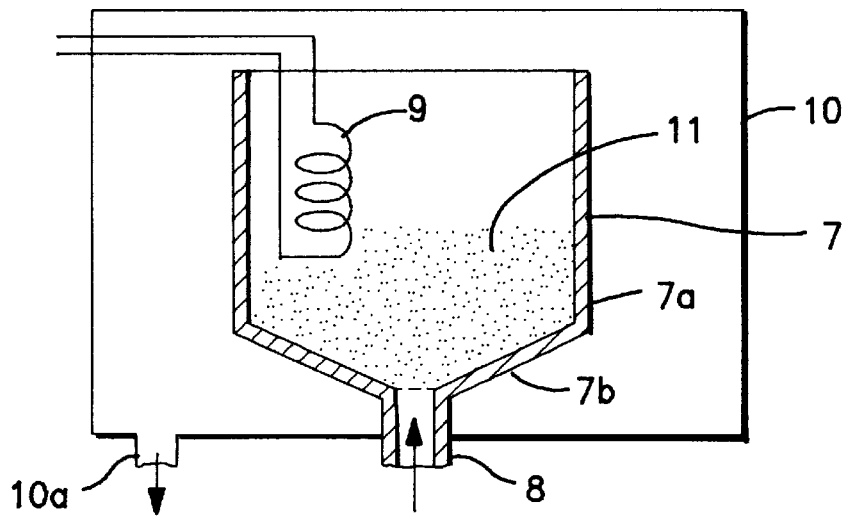
FIG. 2 is a cross sectional elevational view illustrative of the conventional apparatus for applying coaling films on phosphor particles by use of the conventional thermal chemical vapor deposition method.
Figure 3:
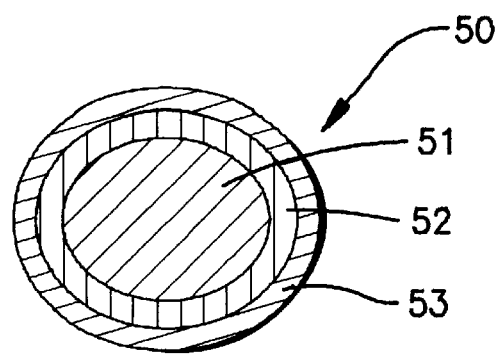
FIG. 3 is a cross sectional elevation view illustrative of an improved phosphor particle in accordance with the present invention.

A preferred embodiment according to the present invention will be described. FIG. 3 is illustrative of an improved phosphor particle in accordance with the present invention. A phosphor particle 51 was prepared by activating ZnS with Cu, Ag, Mn, Al, Cl, I, Br or the like. The phosphor particle 51 was coated with first and second coating films 52 and 53 to form a coating phosphor particle 50. The first coating film 52 has a thermal resistivity to prevent deterioration in brightness and life-times due to changing the compositions by dispersion and dissociation of S, Cu. The first coating film 52 makes the surface of the phosphor particle 51 smooth to allow the second coating film 53 to be fine and free of pin holes and allow formation of the second coating film 53 at a small thickness.

The first coating film is formed at a relatively low temperature, for example, not more than 300° C., preferably 200° C. to prevent that dispersion and dissociation of S, Cu makes the composition changed and the brightness and the life-time are deteriorated. Suitable materials for the above conditions are selected to form the first coating film.

It is preferable that the material for the first coating film is chemically stable and has a large adhesion force and a relatively large dielectric constant as well as a large coating coefficient, and that the first coating film may be formed at a relatively low temperature. For example, metal oxides such as silicon oxide, titanium oxide, tantalum oxide, zirconium oxide, yttrium oxide, barium titanate, strontium titanate, and zirconium titanate are available as a material for the first coating film.

The second coating film has a moisture proof to prevent chemical change of the phosphor by moisture and prevent deterioration of the brightness and the life-time.

The second coating film should be fine and stable as well as have a great large sealing ability relative to moisture. $Si_3N_4$ is, for example, available.

The present invention may be applicable to various phosphors made of not only zinc fluorine but also cadmium fluorine, CaS, SrS, BaS, MgS. The present invention may also be applicable to not only electro-luminance device, but also an electron tube and luminescence.

Figure 4:
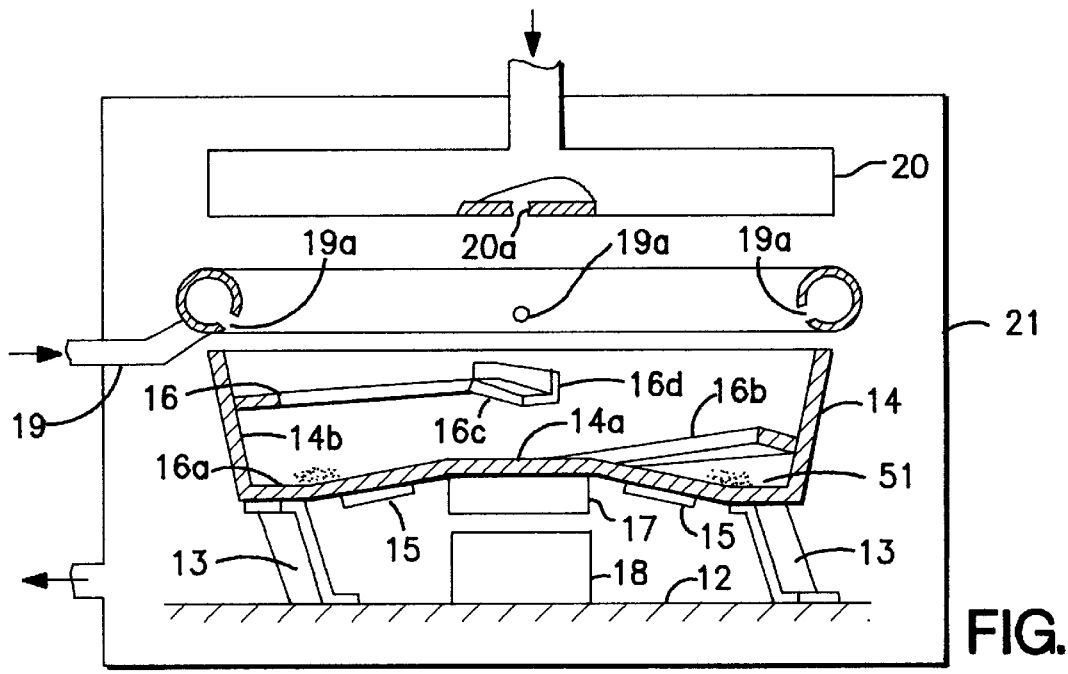
FIG. 4 is a fragmentary cross sectional elevation view illustrative of an apparatus for applying coating films on phosphor particles in accordance with the present invention.

FIG. 4 is a fragmentary cross sectional elevation view illustrative of an apparatus for applying coating films on phosphor particles in accordance with the present invention. The apparatus for applying coating films on phosphor particles has a base 12. Three spring plates 13 are provided on the base 12, wherein only two spring plates 13 are illustrated. The spring plates 13 are positioned on peripheral portions of the base at a uniform interval and extend almost vertically but slightly tilted as illustrated. A container 14 is provided over the base 12 and supported by the three spring plates 13. The container 14 has a bottom portion 14a which has a center portion risen up and is circular-shaped in the plane view, and a cylindrically shaped portion 14b which increases in diameter upwardly. The bottom portion 14a of the container 14 is made of a conductive material so that the bottom portion 14a is connected to an external power source not illustrated to serve as a bottom electrode. A heater 15 is provided on the bottom portion 14b of the container 14 for heating up the container 14. A carrier pass 16 is provided I in the container 14. The carrier pass 16 has a fixed end 16a which is fixed on the cylindrically shaped portion 14b, an intermediate portion 16b in spiral fixed on the size walls of the cylindrically shaped portion 14b and a free end 16c which is positioned over the center of the bottom portion 14b. A side wall 16d is provided which is connected to the free end 16c and connected to the side wall 16d. A magnetic adsorption piece 17 is provided under the center portion of the bottom portion 14a of the container 14. A magnetic 18 is provided on the base 12 to face the magnetic adsorption piece 17 so that the magnetic adsorption piece 17 and the magnetic 18 form a vibrator for providing the container 14 with a vertical vibration force. Since, however, the container 14 is supported by the spring plates 13, the vertical vibration force is converted into the composition vibrations in lateral and vertical directions.

The applied vibration force are in sawtooth waveform or sine half wave, the material in the container 14 is applied with an advanced force in an oblique and upper direction. The phosphor particles 51 over the bottom portion 14a of the container 14 is circulated through the carrier pass 16 and returned to the bottom portion 14b. A first annular pipe 19 is provided over the container 14 for supplying a first source gas. The first annular pipe 19 has many openings through which the first source gas is discharged.

A top electrode 20 is provided over the first annular pipe 19 to make a pair with the bottom electrode 14a. The top electrode 20 has many openings 20a for supplying second source gas. The above elements are enclosed in a sealing enclosure 21 which keeps a reduced internal pressure.

Outside the sealing enclosure 21, a power source is provided for supplying high frequency voltages onto the bottom and top electrodes 14a and 20. A controller is further provided for controlling the power source. Gas supplier is provided for supplying the first and second source gases. A further controller is provided for controlling the vibrator. A vacuum chamber is provided on the sealing enclosure 21 for causing a vacuum state.

The method for applying coating films on the phosphor particles will be described.

First, the first oxide coating film is formed. The enclosure 21 is opened to supply the phosphor particles 51 and then the enclosure 21 is closed. The vacuum pump is used to reduce the pressure of the enclosure 21. An oxide source gas is supplied via the second pipe 20 at a flow rate of 100–1000 sccm. A high frequency voltage of a frequency of 13.56 MHz and a power of 400 W is applied between the top and bottom electrodes to cause an oxygen gas plasma. The vibrator is used to circulate the phosphor particles 51 through the carrier pass 16 in the container 14. The first source gas such as tetraethoxysilane gas is supplied via the first pipe 19 at a flow rate of 1–20 sccm. After the first and second gases are introduced into the chamber 14, the pressure of the enclosure 21 is maintained at 100 Pa. The tetraethoxysilane gas supplied to the oxygen gas plasma atmosphere is adhered onto the surfaces of the phosphor particles 51. The tetraethoxysilane gas is then reacted with plasma-excited oxygen atoms to form silicon oxide whereby a silicon oxide film is formed on the surface of the phosphor particle. The phosphor particles 51 rotate and move in the chamber 14 with exposure to the oxygen gas plasma atmosphere, for which reason the silicon oxide coating film is entirely formed on the surface of the phosphor particle. The thickness of the silicon oxide coating film is determined by the time of the above treatment, the power of the high frequency voltage and the pressure of the enclosure 21, even the thickness of the silicon oxide coating film is preferably thin. The phosphor particles coated with the first coating film are then supplied in the container 14 to form the second coating film. A fourth source gas such as ammonia gas is supplied via the second pipe at a flow rate of 10–100 sccm. A third gas such as dichlorosilane gas is supplied via the first pipe at a flow rate of 1–20 scm. The heater 15 heats the particles to 300°–700° C., preferably 400°–500° C. The second coating film of silicon nitride is formed by a chemical vapor deposition to obtain double coating phosphor particles 50. The thickness of the second layer is determined in consideration of various conditions.

It is possible to make an annealing process after the first coating film is formed to make the life-time long. The time of annealing is preferably 1–60 minutes. If the annealing time is not more than 1 minute, then an insufficient life time is obtained. If, however, the annealing time is over 60 minutes, then the brightness is reduced. The annealing temperature is preferably not more than 1020° C. The rising of the annealing temperature makes the like time long but the brightness reduced. In consideration of the above both factors, 600°–900° C. particularly 750°–850° C. is preferably.

Figure 6:
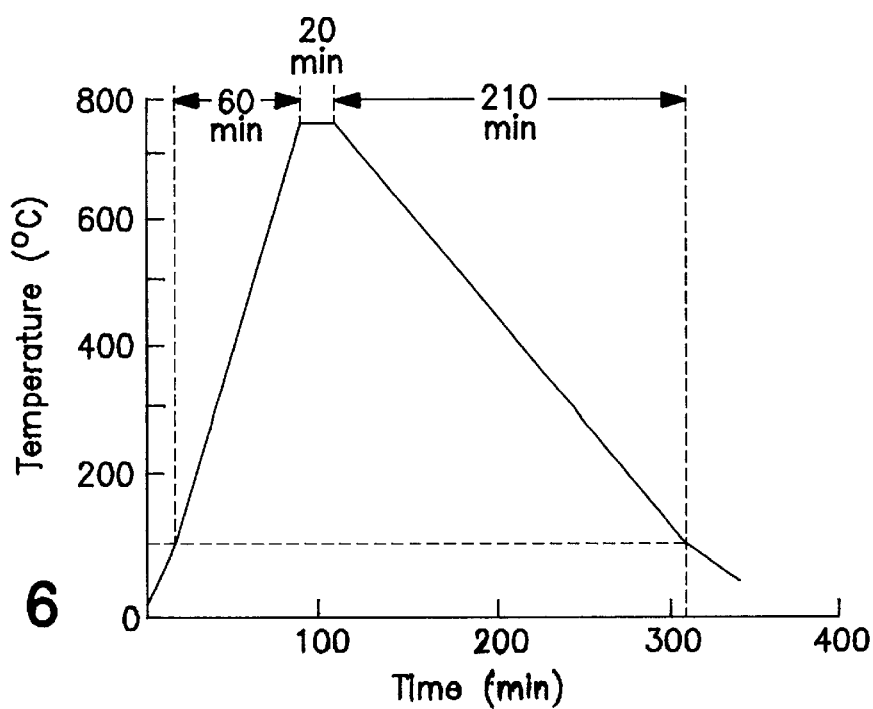
FIG. 6 is a view illustrative of a temperature profile in an annealing process in accordance with the present invention.

The temperature-rising time and the temperature-drop time of the annealing process at 400° . 500° C. are preferably 50–80 minutes and 80–240 minutes. If the annealing temperature is 750° C. and the reference temperature is 100° C., then it is preferable that the temperature-rising time rate and the temperature-drop rate of the annealing process at 400°–500° C. are preferably 8°–13° C./min. and 3°–8° C./min. If the annealing temperature is 750° C. and the temperature-rising time is 60 min. and the temperature-drop time is 210 min. and the holding time is 20 min., the standard temperature profile is as illustrated in FIG. 6.

Figure 5:
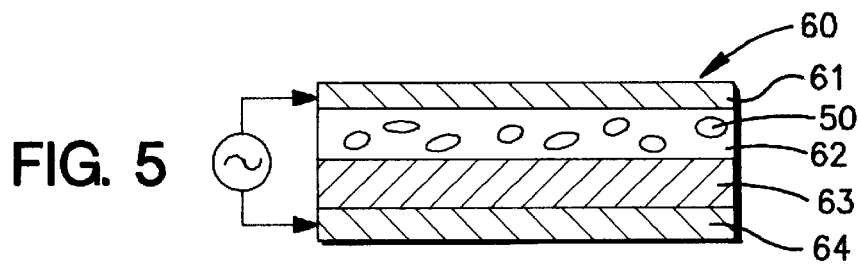
FIG. 5 is a fragmentary cross sectional elevation view illustrative of a field luminescent panel using double-coating phosphor particles in accordance with the present invention.
Figure 7:
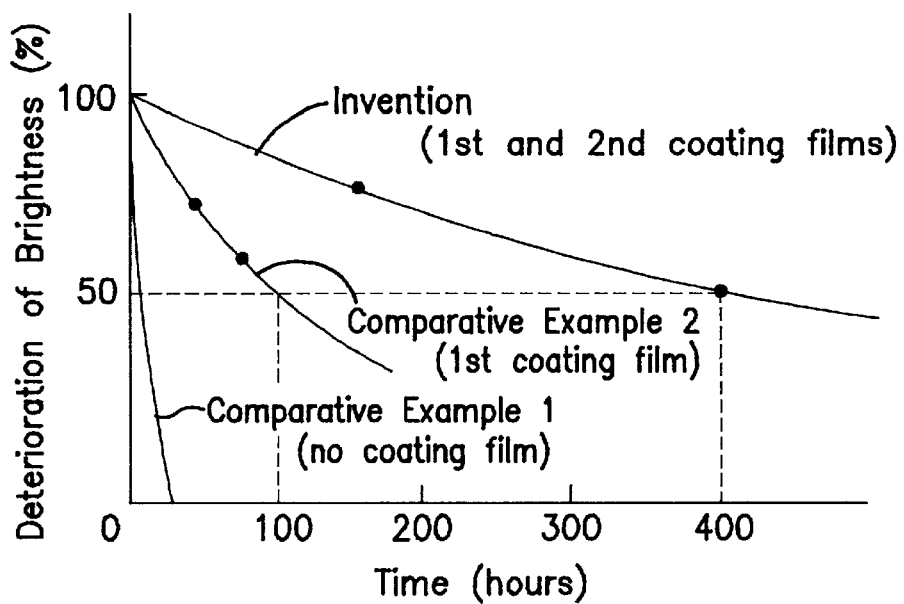
FIG. 7 is a view illustrative of variation in brightness over times of improved and conventional field luminescent panels.
Figure 8:
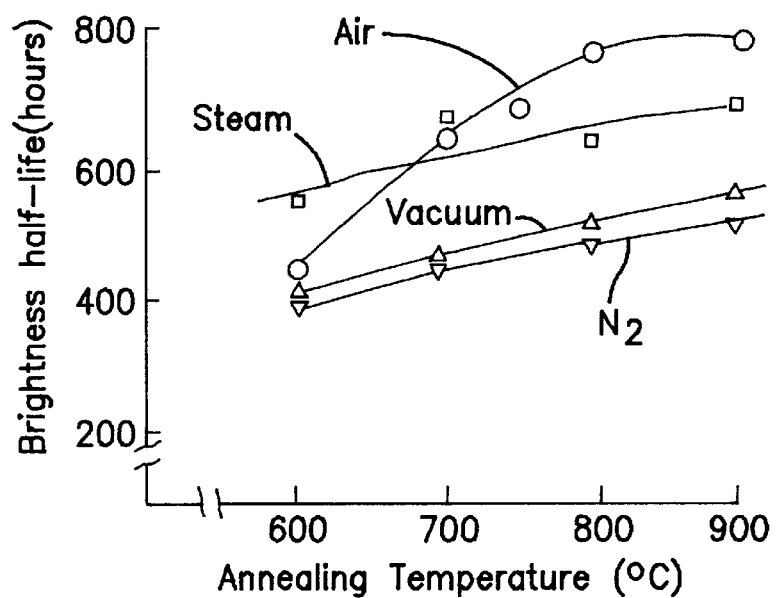
FIG. 8 is a view illustrative of variations in brightness half-time over annealing temperature in various atmospheres.

FIG. 7 is a view illustrative of variation in brightness over times of improved and conventional field luminescent panels, wherein uncoated phosphor particles, single coating phosphor particles coated with a first coating film and double coating phosphor particles coated with the first and second coating films and annealed and double coated phosphor particles coated with first and second coating films are formed. An EL panel is formed to compare properties those phosphor particles as illustrated in FIG. 5. Between the back plate and transparent electrode 61, a reflective insulation film 63 and a luminescent layer 62 containing the phosphor particles 50 are inserted. The EL panel is light up under 400 Hz, 100V, 50° C., and 90% RH atmosphere to observe deterioration of the brightness. The results are as illustrated in FIGS. 7 and 8.

What is claimed is:

1. A coating for phosphor particles, comprising a metal oxide film which coats the phosphor particles and a silicon nitride film which coats the metal oxide film.

2. The coating of claim 1, wherein the metal oxide is selected from the group consisting of silicon oxide, titanium oxide, tantalum oxide, zirconium oxide, yttrium oxide, barium titanate, strontium titanate, and zirconium titanate.

* * * * *